United States Patent [19]

Azibert et al.

[11] Patent Number: 5,213,340

[45] Date of Patent: May 25, 1993

[54] BALANCED MECHANICAL SEAL

[75] Inventors: Henri V. Azibert, Windham; Margaret B. Willbrant, Derry, both of N.H.; Ann T. Attenasio, Revere, Mass.

[73] Assignee: AW Chesterton Company, Stoneham, Mass.

[21] Appl. No.: 873,707

[22] Filed: Apr. 22, 1992

Related U.S. Application Data

[63] Continuation of Ser. No. 619,207, Nov. 28, 1990, abandoned.

[51] Int. Cl.⁵ .............................................. F16J 15/34
[52] U.S. Cl. ...................................... 277/27; 277/65; 277/93 R; 277/935 D
[58] Field of Search .................... 277/3, 27, 59, 65, 63, 277/85, 87, 91, 81 R, 15, 93 SD, 93 R, 73, 74, 75, 83, 38, 39, 40, 41

[56] References Cited

U.S. PATENT DOCUMENTS

| | | |
|---|---|---|
| 2,226,001 | 12/1940 | La Bour . |
| 2,577,858 | 6/1950 | Sampson . |
| 3,057,646 | 10/1962 | Brumagim . |
| 3,261,611 | 7/1966 | Maidment . |
| 3,588,124 | 12/1968 | Guinard . |
| 3,591,188 | 8/1969 | Eisner . |
| 3,968,969 | 7/1976 | Mayer et al. . |
| 4,290,611 | 9/1981 | Sedy .................... 277/63 X |
| 4,377,290 | 3/1983 | Netzel .................... 277/38 |
| 4,466,619 | 8/1984 | Adams . |
| 4,538,821 | 9/1985 | Wallace ............ 277/81 R |
| 4,606,712 | 8/1986 | Vondra . |
| 4,613,142 | 9/1986 | Heilala ............ 277/93 SD |
| 4,639,000 | 1/1987 | Warner ............ 277/87 X |
| 4,721,311 | 1/1988 | Kakabaker . |
| 4,737,087 | 4/1988 | Hertell . |

FOREIGN PATENT DOCUMENTS

9114118 9/1991 PCT Int'l Appl. .
2123098 1/1984 United Kingdom .................... 277/3

OTHER PUBLICATIONS

"222 Motion Seal", Publication of A. W. Chesterton, form No. 074930 rev. 4, printed in USA Feb. 1992.

Primary Examiner—William A. Cuchlinski, Jr.
Assistant Examiner—Scott W. Cummings
Attorney, Agent, or Firm—Lahive & Cockfield

[57] ABSTRACT

A mechanical seal assembly is disclosed in which the seal faces of the primary seal members remain essentially perpendicular to the shaft of the equipment being sealed regardless of any misalignment between the shaft and the equipment. The seal assembly has a sleeve for mounting on the shaft, the sleeve providing a support structure wherein all primary seal member faces are aligned with respect to this support structure regardless of loading. The primary seals are uniformly and persistently urged toward the support structure by the combination of net hydraulic pressure at the mated seal faces plus steady bias from a minimally flexing biasing source, such as compression springs, at one end of the sleeve. In a double balanced double seal embodiment of the invention, each primary seal piston area and the seal face contact area of the associated mated primary seals is determined without regard to location or thickness of secondary seals. Each piston area is a predetermined fixed area equal to a major portion of the associated primary seal face contact area.

17 Claims, 4 Drawing Sheets

BALANCED MECHANICAL SEAL

This application is a continuation of application Ser. No. 619,207, filed Nov. 28, 1990, now abandoned.

FIELD OF THE INVENTION

This invention relates to balanced mechanical seals and particularly to a double balanced mechanical seal.

BACKGROUND OF THE INVENTION

Mechanical seals utilize relatively rotating, contacting seal faces to isolate and seal a pressurized liquid, i.e., the process fluid. To cool the seals and to aid in preventing any passage of process fluid across the seal faces, a second pressurized liquid, i.e., a barrier fluid, is often introduced to the seals on the side of the seal faces opposite that in contact with the process fluid. Springs normally bias the seal faces together. In balanced seal arrangements the pressurized fluids are also applied to piston areas defined on the sides of the seal members opposite the seal faces to aid in closing the seal faces. In general, it is desirable to have the piston area associated with the fluid having the higher pressure to be less than 100% and preferably about 70% of the contact area of the seal faces. This relationship minimizes heat generation from the frictional contact of the seal faces while maintaining a closing force on the seal faces sufficiently high to assure proper sealing. It is also desirable to minimize the contact area of the seal faces so as to minimize heat generation as the seal faces rotate relative to each other. Additionally, when a barrier fluid is employed, a double seal arrangement is often utilized in which the process fluid is confined to one end of the seal and the barrier fluid to the center of the seal with relatively rotating seal faces on either side of the barrier fluid.

In one type of double balanced seal in the prior art, both fluids have access to the rear of the seal members opposite the seal faces and the desired balance ratio of the piston area to the seal face contact area is achieved by providing O-rings slidable in their O-ring grooves behind the respective seal faces of the seal members. Thus, the O-rings slide in the grooves to permit application of fluid pressure from the fluid having the highest pressure to the appropriate piston areas on the sides of the seal members opposite the seal faces. Springs are located within the seal on either side of the seal faces and may be exposed to either or both of the process and barrier fluids. This arrangement has significant limitations. First, since the inner and outer diameters of the O-rings define the balance pressure points for the respective fluids, the radial contact dimension of the seal faces must be sufficiently large to account for the thickness of the O-rings. This limits the design of the seal faces for which minimum contact area is desired. Second, if the O-rings do not will not be achieved as intended. Additionally, the springs, exposed to the process and barrier fluids, are subject to contamination and corrosion.

SUMMARY OF THE INVENTION

In one aspect, the present invention features a mechanical seal comprising a first pair of relatively rotatable annular seal members for sealing an separating process and barrier fluids respectively on one of the outer and inner peripheries of the first pair of seal members, the first pair of seal members defining a first pair of annular, radially extending, opposed seal faces therebetween first pair of secondary seals, contacting the first pair of seal members, at positions spaced axially from the seal faces, on the rear sides thereof opposite the seal faces, to prevent passage of fluid axially along said first pair of relatively rotatable seal members. The first pair of secondary seals seal fixed diameters of the first pair of seal members on the rear sides thereof; and the first pair of seal members comprise generally radially extending piston areas on the rear sides thereof, the piston areas axially aligned with and smaller than the contact area of the seal faces and each such piston area comprising a predetermined fixed area equal to a major portion of the contact area, one of the piston areas extending radially inwardly and in communication with the inner periphery of the first pair of seal members and the other of the piston areas extending radially outwardly and in communication with the outer periphery of the first pair of seal members, one of the and the other one of the piston areas serving as a piston area for the process fluid.

In a preferred embodiment, the seal further comprises a second pair of relatively rotatable annular seal members defining a second pair of annular, radially extending, opposed seal faces therebetween, axially spaced from said first pair of seal faces and contacting each other over a predetermined contact area, and a second pair of secondary seals contacting the second pair of seal members at position spaced axially from the second pair of seal faces on the rear sides thereof opposite the second pair of seal faces, to prevent passage of fluid axially along the second pair of relatively rotatable seal members. The second pair of secondary seals seal fixed diameters of said second pair of seal members on the rear sides thereof, and one seal member of the second pair of seal members is positioned at one end of the seal with the rear side thereof facing outwardly away from the others of the first and second pairs of seal members, the rear side of the one seal member of said second pair of seal members comprises a generally radially extending piston area axially aligned with and smaller than said contact area of the second seal faces and has a predetermined fixed area equal to a major portion of said contact area, the piston area of said one seal member of said second pair of seal members extends radially inwardly and communicates with the inner periphery of said second pair of seal members.

In especially preferred embodiments, the contact areas of the first and second pairs of seal faces are equal; one seal member of said first pair of seal members is positioned at the opposite end of the seal from the one seal member of the second pair of seal members, facing away from the others of the first and second seal members, and has the piston area thereof extending radially inwardly and communicating with the inner periphery of the first pair of seal members, the piston areas of the one seal members of the first and second pairs seal members being equal; the seal further comprises a sleeve on which the first and second pairs of seal members are mounted further characterized in that the sleeve has a flange at one end extending radially outwardly, the flange having a surface facing the other end of the sleeve extending radially at a right angle to the inner surface of the sleeve, and the one seal member of the first pair of seal members abuts said flange; compression springs are connected to the other end of the sleeve biasing against the one seal member of said second pair of seal members biasing the first and second pairs of seal members and the seal faces thereof toward the flange;

the other seal members of the first and second pair of seal members contact each other at a position spaced from piston area of the other of the first pair of seal members; the one seal members of the first and second pairs of seal members, each comprises an annular extension thereof on the side thereof opposite the seal faces, said extensions having enlarged inner diameters relative to the inner diameters of the contact areas of the seal faces, the inner diameters of said extensions equal to the outer diameters of the piston areas of the one seal members of the first and second pairs of seal members, and one secondary seal of each of the first and second pairs of secondary seals sealing against the respective annular extensions of the one seal members of the first and second pairs of seal members at positions spaced from the piston areas thereof; the other seal members of the first and second pairs of seal members each comprises an annular extension thereof on the side thereof opposite its seal face, the extensions having reduced outer diameters relative to the outer diameters of the contact areas of the seal faces, the outer diameters of the extensions equal to the inner diameter of said piston area of the other seal member of the first pair of seal members, and the other secondary seal of each of the first and second pairs of secondary seals sealing against the respective annular extensions of the other seal members of the first and second pairs of seal members at positions spaced from each other and spaced from the piston area of the other seal member of the first pair of seal members; the one seal members of the first and second pairs of seal members are connected to the sleeve for rotation therewith on a machine shaft and the others of the seal members are connected to structure adapted to be maintained stationary; and the seal comprises a seal gland, comprising the stationary structure, the other seal members of the first and second pairs of seal members are connected to the seal gland at the annular extensions thereof, the seal gland comprises barrier fluid ports communicating with the area between the other secondary seals, and the extensions of the other seal members of the first and second pairs of seal members have apertures extending radially therethrough between the other seal members permitting barrier fluid access between the sleeve and the seal members.

In another aspect, the present invention features a mechanical seal comprising a sleeve, first and second pairs of relatively rotatable seal members on the sleeve respectively having first and second radially extending opposed seal faces therebetween contacting each other over predetermined contact areas. The sleeve has a flange at one end thereof with a surface extending radially outwardly at a right angle to the inner surface of the sleeve; the seal members are assembled on the sleeve in abutting relation with one of the seal members abutting said flange surface and with the two seal members at the ends of the assembly connected to the sleeve for rotation therewithin, the other seal members adapted for connection to a stationary structure; and biasing means are connected to the sleeve at the end opposite the flange contacting and the seal member thereadjacent and biasing the seal members toward said flange.

Advantageously, a seal according to the present invention achieves pressure balance by virtue of the geometry of the parts, providing fixed, predetermined piston areas on the sides of the seal members opposite the seal faces without reliance on any movable parts which may be subject to malfunction. An individual piston area is exposed to only one of the fluids. Further, the contact area of the seal faces may be optimized without any limitation imposed by the size of the O-rings defining the balance pressure points. According to another feature of the invention, the springs biasing the seal faces are positioned at one end of the seal and are not exposed to either process or barrier fluids. Advantageously, these springs can be observed as a measure of seal face wear. Additionally, the spring load is not affected by any axial excursions of the shaft to which the seal is mounted. Advantageously, as well, pressure balance of the seal faces is achieved in both directions with no relative motion of the seal parts. Because it is possible to design seal faces having a small contact area, heat generation in operation of the seal is minimized.

Other features and advantages of the invention will be apparent from the following description of the preferred embodiment thereof and from the claims.

DESCRIPTION OF THE DRAWINGS

FIG. 2b is an enlarged sectional view of the seal of FIG. 1, taken at line 2b-2b of FIG. 2a.

DETAILED DESCRIPTION

Figure 1:
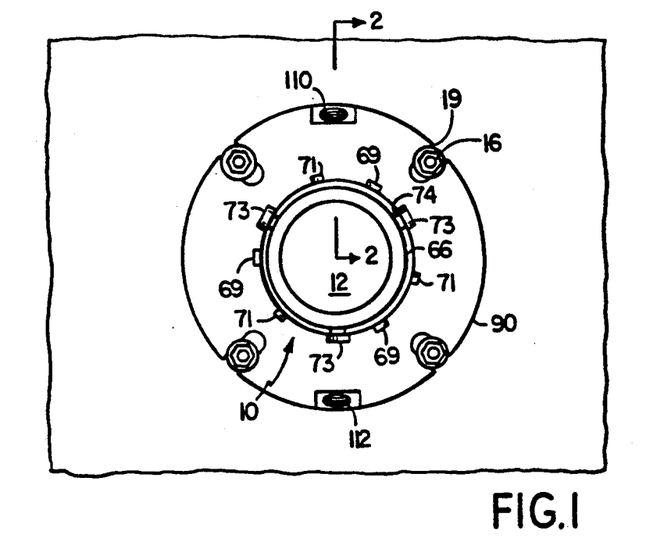
FIG. 1 is a front elevation view of a mechanical seal.
Figure 2:
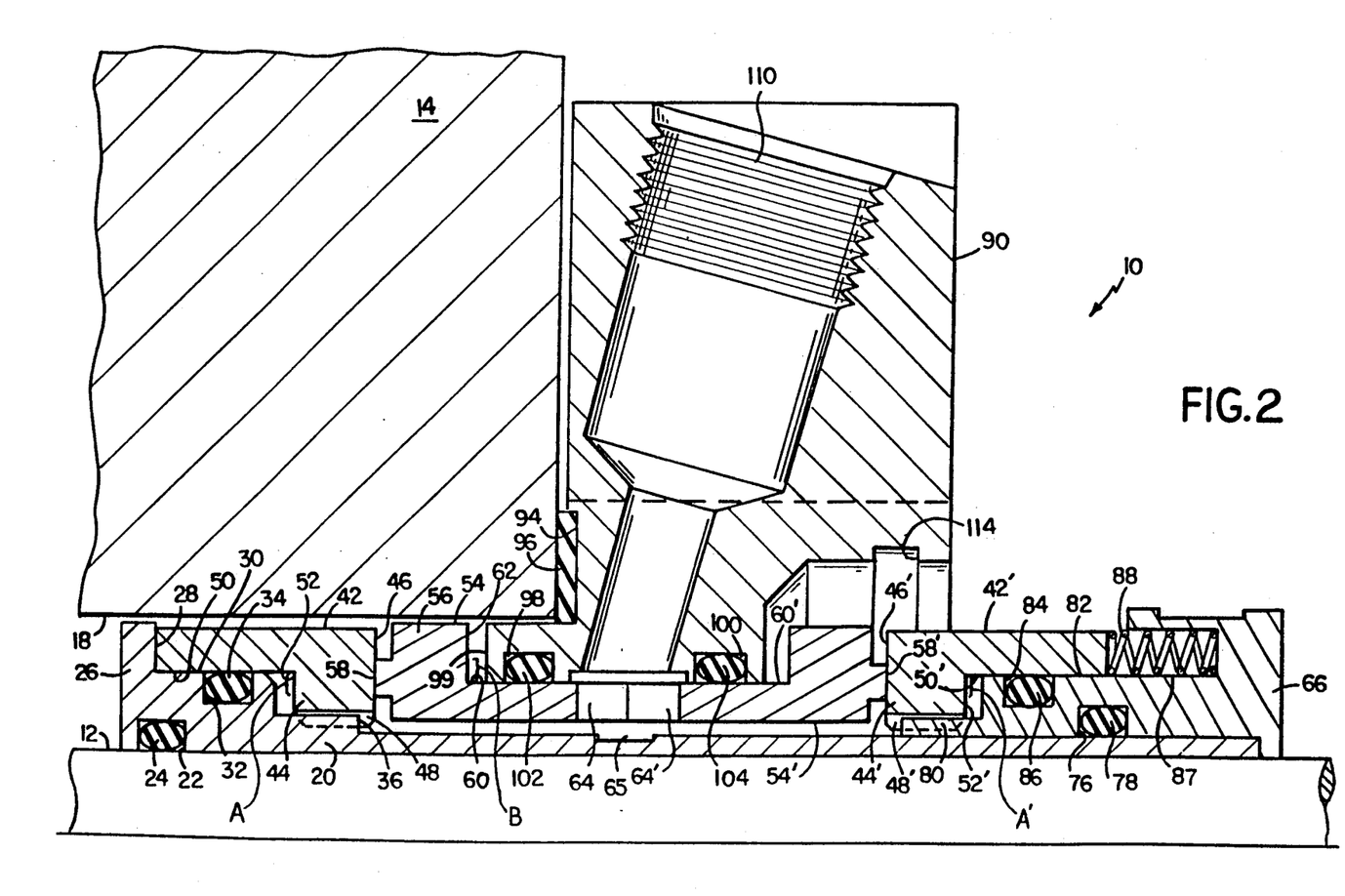
FIG. 2 is an enlarged sectional FIG. 1 taken at line 2—2.

Referring now to the drawings and more particularly to FIGS. 1 and 2 thereof, a mechanical seal 10 according to the invention is mounted on a pump shaft 12 and is secured to the pump housing 14 by bolts 16. Seal 10 extends partially into the stuffing box 18 of the pump housing.

Figure 3:
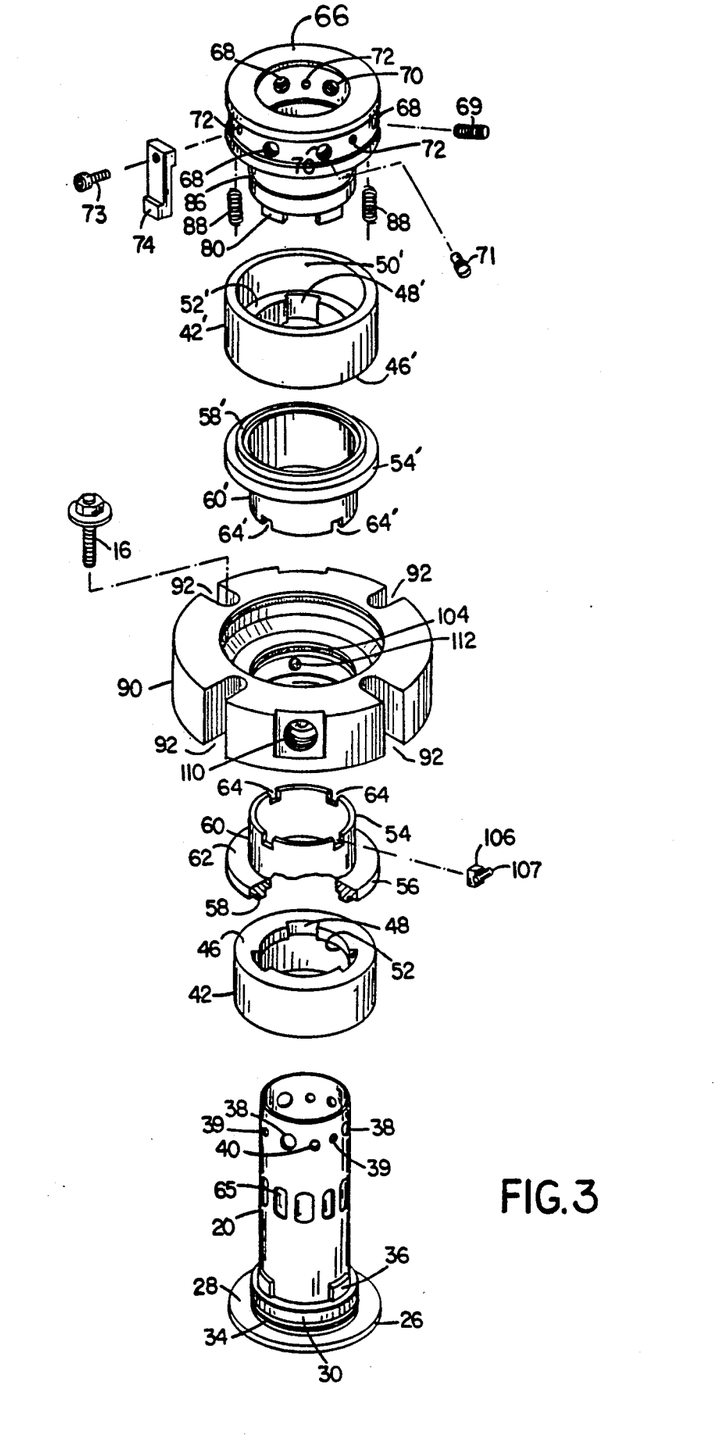
FIG. 3 is an exploded perspective view of the seal of FIG. 1.

The seal 10 comprises a sleeve 20 adjacent shaft 12. At the inboard end of the sleeve 20, i.e., the end inserted into the stuffing box 18, a groove 22 on the inner periphery of sleeve 20 receives an O-ring 24 adjacent shaft 12 to prevent process fluid from passing between sleeve 20 and shaft 12. Sleeve 20 has a stepped construction at its end, comprising a flange 26 at the inboard end, the flange having an outer diameter smaller than the inner diameter of the stuffing box 18 and having an outwardly facing wall 28 squared at right angles to the inner surface of sleeve 20 adjacent shaft 12. A step 30 is provided axially outwardly of flange 26 and has a diameter greater than that of the major portion of sleeve 20 but smaller than that of flange 26. A groove 32 in the outer surface of step 30 receives an O-ring 34. A plurality of bosses 36 are provided adjacent step 30 about the circumference of the sleeve. In the embodiment described, three bosses equally spaced are provided about the sleeve. Referring to FIG. 3, adjacent the outer end of the sleeve, a plurality of circular apertures extend through the sleeve comprising three large apertures 38, three smaller apertures 39, and three smaller apertures 40, the apertures alternately equally spaced about the circumference of the sleeve.

Referring again to FIG. 2, a rotary seal member 42 is mounted on the inboard end of sleeve 20. The seal member 42 comprises a relatively wide seal portion 44 having an axially outwardly facing seal face 46. Seal member 42, on its inner diameter, has a plurality of notches 48 engaging the bosses 36 on sleeve 20 and locking the rotary seal member 42 to sleeve 20 for rotation therewith. The outer diameter of rotary seal member 42 is slightly smaller than of flange 26 of sleeve 20 and is spaced from the inner wall of the stuffing box 18. On the side of seal portion 44 opposite face 46, the inner diameter of rotary seal member 42 is increased, providing a step 50 having an inner diameter approximately equal to the outer diameter of step 30 on sleeve 20. O-ring 34 in sleeve step 30 seals against the inner diameter of step 50 of rotary seal 42. The inner diameter of seal portion 44 of rotary seal member 42 is slightly greater than the local outer diameter of sleeve 20, and the axially inwardly facing wall 52, opposite seal face 46, is spaced from step 30 to permit fluid access therebetween, thus forming piston area A illustrated in FIG. 4. In a particular embodiment, the rotary seal member 42 is made of silicon carbide.

A stationary seal member 54 is provided outwardly of rotary seal member 42. Stationary seal member 54 comprises a seal portion 56 extending from an inner diameter somewhat greater than the outer diameter of sleeve 20 to an outer diameter slightly smaller than the inner diameter of stuffing box 18. A narrow axially inwardly facing seal face 58 extends from the seal portion 56 toward and sealingly engages the seal face 46 of rotary seal member 42. Outwardly of seal portion 56 of stationary seal member 54, a step 60 is provided having an outer diameter reduced relative to the outer diameter of sealing portion 56 and defining an axially outwardly facing wall 62 on the side of sealing portion 56 opposite seal face 58. At the outer end of the step, four equally spaced notches 63 extend radially through the step. In a particular embodiment, the stationary seal 54 is made of carbon.

A second stationary seal member 54' is provided outwardly of the first stationary seal member 54 in reverse orientation, i.e., with the seal face 58' facing axially outwardly. Stationary seal member 54' is identical to stationary seal member 54, and the corresponding portions thereof are designated with the same reference numerals differentiated by a prime designation. The ends of the stationary seal members 54, 54' opposite seal faces 58, 58' contact each other with notches 64, 64' aligned.

Similarly, outwardly of the second stationary seal member 54' a second rotary seal member 42', identical to rotary seal member 42 and reversely oriented relative thereto, is provided, with a seal face 46' contacting the seal face 58' of the second stationary seal member 54'. The portions of the second rotary seal member 42' are designated with the same reference numerals distinguished by a prime designation, as the corresponding portions of the first rotary seal member 42.

A lock ring 66 is mounted on sleeve 20 at the outer end thereof. Lock ring 66, as illustrated in FIGS. 2 and 3, has a radially enlarged outer end having threaded apertures 8 aligned with apertures 38 for receiving fasteners 69 locking the seal assembly to the shaft 12 for rotation therewith. The enlarged end of lock ring 66 also has threaded apertures 70 aligned with apertures 40 in sleeve 20 for receiving threaded fasteners 71 having cylindrical ends adapted to engage the edges of apertures 40 and axially locate the seal components prior to assembly in a pump. Three additional threaded apertures 72 aligned with apertures 39, equally spaced in the exterior of the lock ring, are provided to receive threaded fasteners 73 for securing centering clips 74 to the lock 66. A groove 76 is provided on the inner surface of the lock ring spaced inwardly from the sleeve apertures 38, 39, 40 and the lock ring apertures 68, 70, 72. An O-ring 78 is provided in groove 76 to prevent fluid from moving along the surface between the outer surface of the sleeve 20 and lock ring 66. The inner edge of lock ring 66 is provided with three axially extending protrusions 80 corresponding to the bosses 36 at the other end of the sleeve 20. Notches 48' in the second rotary seal member engage the protrusions 80 of the lock ring 66, locking the second rotary seal 42' thereto for rotation with the shaft 12 and sleeve 20. Between protrusions 80 and apertures 68, 70, 72 lock ring 66 has a step 82 having a diameter corresponding to the diameter of step 30 at the other end of the sleeve. Step 82 has a groove 84 receiving an O-ring 86 sealing against the step 50' at the inner diameter of second rotary seal member 42'. The inner diameter of second rotary seal member 42' at the seal portion 44' thereof is slightly larger than that of the sleeve. Wall 52' on the side of second rotary seal member 42' opposite seal face 46' is spaced from the lock ring step 82 to permit access by fluid, thus forming piston area A' as shown in FIG. 2, equal to piston area A. A series of axial bores 87 about the inwardly facing wall of lock ring 66 provide pockets for springs 88 bearing against the outer end of the second rotary seal member 42'. Springs 88 bias all seal faces toward flange 26 at the inward end of sleeve 20.

A seal gland 90 is positioned generally centrally of the seal assembly. Gland 90, as shown in FIG. 1, has a plurality of slots 92 about the exterior thereof to receive mounting bolts 16 for mounting the gland and the seal assembly to the pump housing 14. An annular groove 94 on the inner side of gland 90 receives a gasket 96 to prevent leakage of fluid between the pump housing and the gland. The inner diameter of the gland is provided with a pair of axially spaced grooves 98, 100 receiving O-rings 102, 104, respectively, overlying and sealing against the stepped walls 60, 60' of stationary seal members 54, 54'. The axially inwardly facing end 99 of the gland is spaced from axially outwardly facing wall 62 of stationary seal member 54 to permit access by the process fluid, thus forming piston area B, best shown in FIG. 4.

Figure 2A:
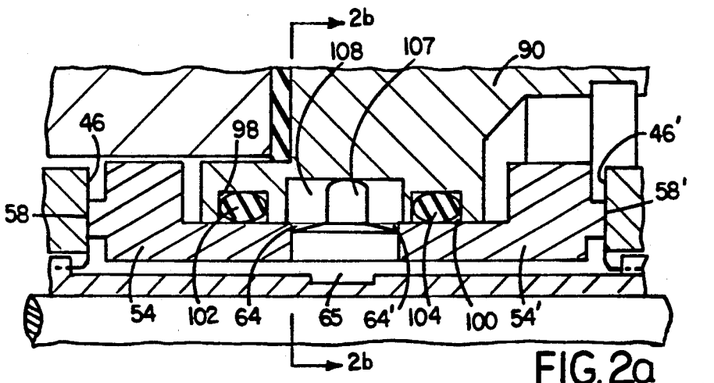
FIG. 2a is a fragmentary sectional view of the seal of FIG. 1 similar to FIG. 2, taken at a point rotated 90° from FIG. 2.
Figure 2B:
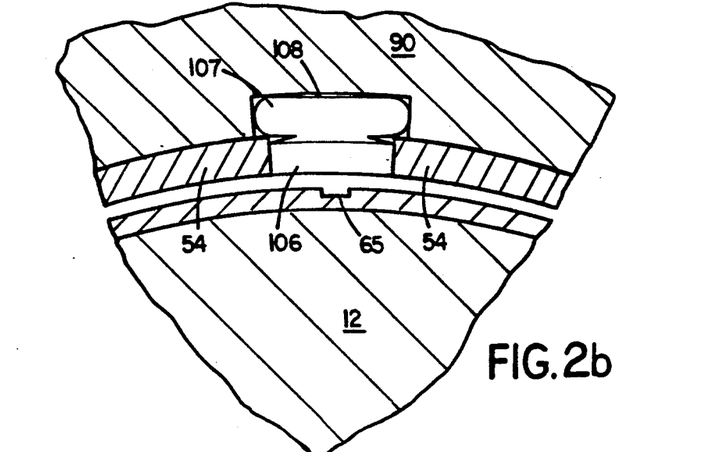

Referring to FIGS. 2a, 2b, and 3, a lug 106 is placed in one of the aligned sets of notches 64, 64' of stationary seal 54, 54' and extends into a recess 108 provided on the inner diameter of the gland, between grooves 98, 100. Lug 106 comprises a generally square base fitted in notches 64, 64' and a transverse cross bar 107 extending into recess 108 in gland 90 adjacent notches 64, 64'. Cross bar 107 is spaced from the axially spaced end walls of the recess 108 and contacts the side walls of recess 108. Cross bar 107 and recess 108 are somewhat wider, circumferentially, than notches 64, 64' whereby lug 106 is retained in position when assembled. Lug 106 locks stationary seal members 54, 54' to gland 90 and secures the seal members against rotation while permitting axial excursions of the seals 54, 54' without interference by the gland. Gland 90 is provided with a pair of ports 110, 112 opening at the interior of the gland between grooves 98, 100. Ports 110, 112 are provided as inlet and outlet ports for a barrier fluid which passes through those notches 64, 64' not containing lug 106.

The exterior surface of sleeve 20 aligned with notches 64, 64' and ports 110, 112 preferably is provided with a plurality of axially extending grooves 65 about its circumference. The grooves function as pumping vanes to pump barrier fluid from one port to the other. On the exterior of the seal about the inner periphery of gland 90, a groove 114 is provided to receive the radially outwardly projecting ends of the centering clips 74. The centering clips thus assure axial positioning of the gland and centering of the gland and the stationary seal.

Figure 4:
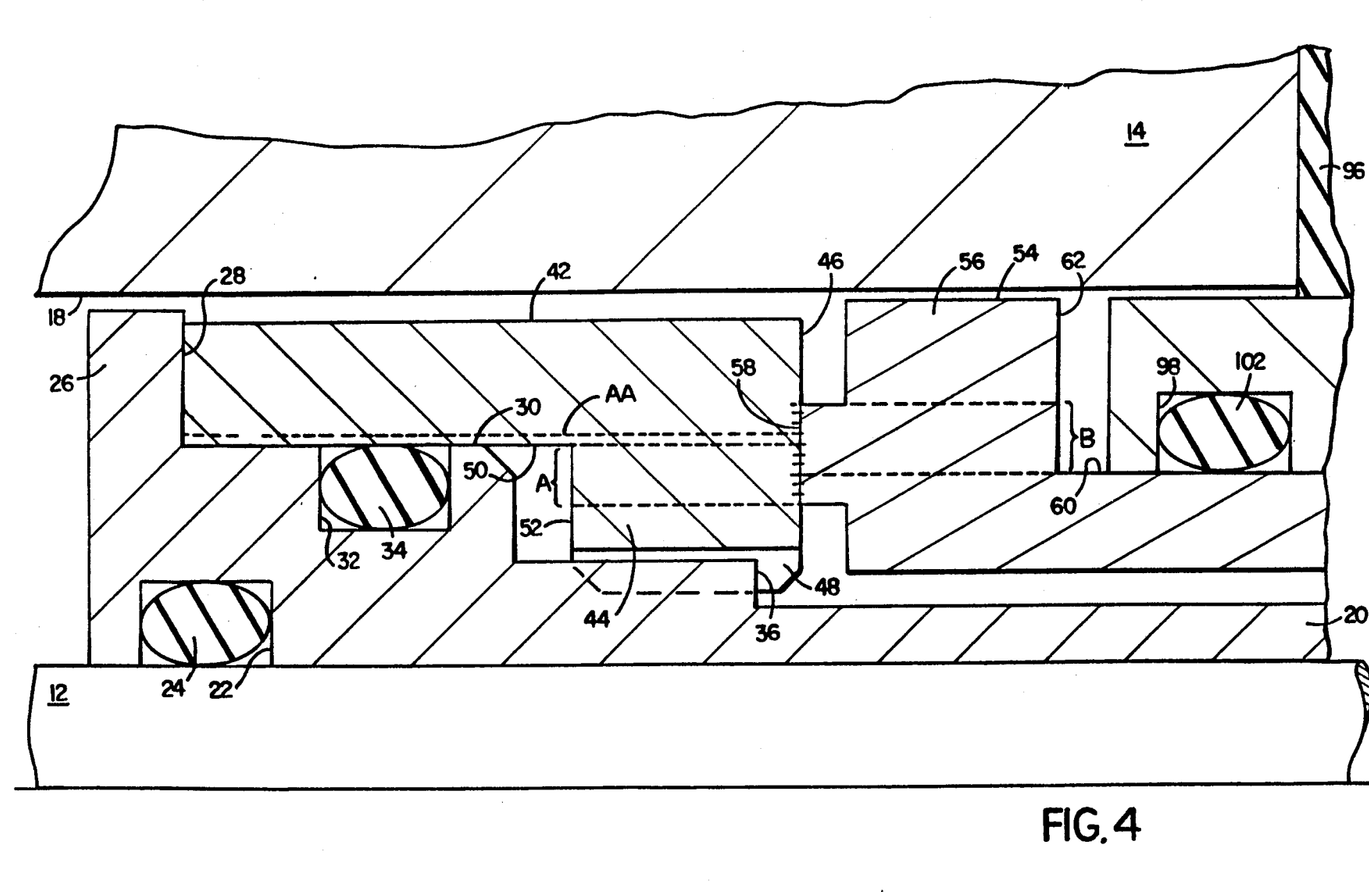
FIG. 4 is an enlarged fragmentary view of a portion of the sectional view of FIG. 2.

Referring to FIG. 4, the inner seal members 42 and defining the first pair of seal faces 46, 58, are adapted to permit the barrier fluid to exert pressure on wall 52, opposite seal face 46, and the process fluid to exert pressure on wall 62, opposite seal face 58. The walls 52, 62 thereby define predetermined, fixed piston areas, piston area A and piston area B, respectively, transmitting pressure from one of the fluids toward the first pair of sealing faces 46, 58. Each piston area is defined by the extent to which the associated wall 52, 62 overlaps the contact area of the seal faces 46, 58. Thus, in the case of rotary seal member 42, piston area A of wall 52 extends between the inner diameter of stationary seal face 58 and the diameter of wall 52 at step 50. Similarly, piston area B on wall 62 of stationary seal member 54 extends between the outer diameter of stationary seal face 58 and the diameter of wall 62 at step 60. In the illustrated embodiment, O-ring seals 34 and 102 define the limits of the piston areas inwardly of the inner and outer diameters of seal face 58 where they seal against steps 50 and 60 respectively. By proper radial location of the steps 50, 60 and seal rings 34, 102, the piston area in each direction (piston areas A and B) can readily be designed to comprise the desired percentage of the contact area of the seal faces 46, 58.

As illustrated in FIG. 4, it is possible to design different piston areas for the respective different fluids. Thus, in one preferred embodiment, the piston area B portion of wall 62 of stationary seal member 54 may equal 70% of the contact area of the seal faces 46, 58, diagrammatically indicated by the tick marks at the faces, each mark representing 10% of the contact area, while piston area A, on wall 52 of rotary seal member 42, equals 60% of the contact area of the seal faces 46, 58. If the geometry of step 30 of sleeve 20 and of rotary seal member 42 were changed so that piston area A of wall 52 extended radially outwardly an additional 10% of the contact area of seal faces 46, 58, piston area A would then also equal 70% of the contact area and would be the same size as piston area B. In the illustrated embodiment, since the spring load necessary to overcome O-ring friction on surfaces, 50', 60 and 60' and to bias the seal faces is 40-50 psi the piston areas A and A' are chosen to comprise 60% (rather than 70%) of the contact area of the contact faces 46, 58 and 46', 58'. Ideally, the piston areas are minimized to reduce friction and heat generation while still providing a safety factor to prevent leakage of fluid across the relatively rotating seal faces. The piston areas must be greater than 50% of the seal face areas to avoid any net force in the opposite direction tending to open the seal faces.

The seal is assembled by placing O-ring 24 in groove 22 and O-ring 34 in groove 32. Rotary seal member 42 is then mounted on sleeve 20 with notches 48 engaging bosses 36 on the surface of the sleeve. O-rings 102, 104 are inserted in grooves 98, 100 of gland 90 and stationary seal member 54 is inserted into the gland with lug 106 in one notch 64 arranged with cross bar 107 in gland recess 108 Stationary seal member 54' is then inserted into the other end of the gland in abutting relation to the station seal member 54 with lug 106 extending into one notch 64'. O-rings 78, 86 are then placed in grooves 76, 84 of lock ring 66, and rotary seal member 42' is mounted on lock ring 66 against springs 88. Gland 90 is mounted about the sleeve 20 and the lock ring is positioned on the end of the sleeve 20. Threaded fasteners 71 are tightened in threaded apertures 70 of the lock ring and into the apertures 40 in the sleeve to axially locate the seal components and to define the pressure exerted by springs 88. Centering clips 74 are fastened into the lock ring by threaded fasteners 73 with their ends extending into groove 114 of gland 90. The centering clips axially locate the gland and center the gland and stationary seals pending the assembly in a pump housing.

To assemble the seal in a pump, the seal assembly is slid along the pump shaft with seals 42, 54 extending into the stuffing box 18 of the pump housing 14. Bolts 16 are then tightened in slots 92 of gland 90 to secure the seal to the pump housing with gasket 96 interposed between the gland and the housing. The seal assembly is then secured to the shaft 12 by threaded fasteners 69 extending through apertures 68 of the lock ring and 38 of the sleeve to lock against shaft 12. Centering clips 74 are then removed from the seal assembly.

In operation, sleeve 20 rotates with shaft 12 and carries with it rotary seal members 42, 42' as well as lock ring 66 and springs 88. Stationary seal members 54, 54' are held in a stationary position by lug 106 engaging notches 64, 64' and gland 90. Springs 88 bias both pairs of seal faces 46, 58 and 46', 58' together and toward flange 26 at the other end of sleeve 20. Process fluid moves between the outer diameter of seal members 42, 54 and the inner diameter of stuffing box 18. Relatively rotatable seal faces 46, 58 seal the process fluid at the stationary/rotary interface and O-ring seal 102 seals process fluid from passing beyond stationary seal member 54. Process fluid exerts a closing pressure force on seal faces 46, 58 as it exerts pressure on piston area B. Preferably, piston are B is equal to 70% of the contact area of the seal faces 46, 58. Barrier fluid entering through one of ports 110, 112 of gland 90 is sealed on the outer side of stationary seals 54, 54' by O-rings 102, 104 in grooves 98, 100. Passing through notches 64, 64' to the outer surface of sleeve 20, the barrier fluid exerts pressure on walls 52, 52' on the opposite sides of rotary seal members 42, 42' from seal faces 46, 58 and 46', 58', at piston areas A and A'. These piston areas comprise 70%, or in a preferred embodiment 60%, of the contact areas of the seal faces 46, 58 and 46', 58'.

Advantageously, the contact area of the seal faces are not limited by O-ring size and can be designed to be as small as feasible to minimize heat generation. Piston areas A, A' of the rotary seal members 42, 42', where pressure from the barrier fluid is applied, can each be somewhat smaller than piston area B of stationary seal member 54, where pressure from the process fluid is applied. Of particular significance, net forces closing the seal faces always are directed toward the flange at the end of the sleeve. Thus, springs 88 provide an initial bias toward the flange; with process fluid exerting force on wall 62 of stationary seal 54, process fluid pressure further biases the assembly toward the flange. As barrier fluid pressure is applied inwardly at each end of the assembly with no net force in either direction, the spring force and any process fluid pressure always product a net force toward the flange. Advantageously, there is no axial motion of the seals relative to the springs; thus, constant spring pressure is applied regardless of axial excursions of the shaft. Any shaft misalignment has no effect on the springs since the springs bias the assembly against a squared end, and thus no spring flexure is required if misalignment should occur. Because the springs are located outside of the pump and gland, they are not subject to corrosion or contamination from either the process or barrier fluids. Additionally, seal face wear can be judged by observing the length of the springs.

Other embodiments of this invention will occur to those skilled in the art are within the scope of the following claims. For example, it would be possible to employ a single stationary seal having two seal faces in conjunction with a split gland.

What is claimed is:

1. A mechanical seal assembly for retaining process fluid within equipment, the equipment having a relatively rotary part and a relatively stationary housing part, the interior of said housing part forming a stuffing box, each being concentric to a central axis of said equipment, said housing part for mounting of said seal assembly concentrically to said equipment central axis, said rotary part being axially shiftable under load between a first and second axial position relative to said housing part, said seal assembly having a first and a second pair of primary seal members, each said pair having a rotary primary seal member associated with said rotary part and a stationary primary seal member associated with said stationary part, said members of each said pair having surfaces defining relatively rotatable seal faces which mate to define an associated seal face contact area, said associated contact area of said first pair defining an axially inboard seal proximally associated with said stuffing box and which is fluidly loaded thereat and said contact area of said second pair forming an outboard seal which is fluidly loaded thereat and which is outboard from said inboard seal, said seal assembly having a central axis and said inboard and outboard seal being formed concentric to said seal assembly axis, said seal assembly further comprising biasing means for applying axial bias to said seal faces, and a support sleeve for mounting concentrically over said rotary part, said support sleeve having an inboard support structure extending radially and essentially perpendicular to said rotary part, said primary seal members being mounted relative to said support sleeve such that said seal faces are held essentially perpendicular to said rotary part, with one of said rotary primary seal members and both of said stationary primary seal members being axially slidably mounted relative to said support sleeve for sliding toward said support structure according to bias from said biasing means, and said support sleeve supporting said biasing means and said slidable ones of said primary seal members such that said bias from said biasing means and net fluid load from said loaded inboard and outboard seals is persistently and evenly applied to said inboard and outboard seals, transmitted through said primary seal members between said biasing means and said support structure, regardless of shifting of said rotary part between said first and second axial positions.

2. The seal assembly of claim 1 wherein said inboard and outboard seals define axially inboard and outboard sides of a fluid flow section of said seal assembly for flow of a barrier fluid within said seal assembly, wherein said equipment rotary part includes a shaft and said support sleeve is configured for mounting on said shaft, said sleeve having an outer mounting surface for mounting of said rotary primary seal members, said support structure comprising a flange of said sleeve extending perpendicularly radially from said sleeve mounting surface, said biasing means being associated with an end of said sleeve with said primary seal members mounted concentrically to said sleeve and biased by said biasing means toward said flange, said rotary primary seal members being coupled to said sleeve via a respective secondary seal with the side opposite to the seal face side of each of said rotary primary seal members being substantially exposed to a common fluid environment, said inboard seal for sealing a first fluid pressure differential and said outboard seal for sealing a second fluid pressure differential, the combination of net sealed pressure plus the bias from said biasing means applying a net axial force to said flange via said primary seal members.

3. The seal assembly of claim 1 wherein said biasing means comprises compression spring located circumferentially about an outboard end of said sleeve assembly, said support sleeve isolating from said inboard and outboard seals the effect of axial shifting of said shaft between said first and second axial positions and substantially preventing flexure of said springs regardless of any said axial shifting.

4. The seal assembly of claim 2 wherein said seal assembly further includes a gland for mounting of said seal to said housing part, said stationary primary seal members each sealed by a respective secondary seal to said gland, said sleeve sealed by an inner secondary seal to said shaft, and wherein said fluid flow section comprises a chamber within said seal assembly, wherein said gland comprises barrier fluid ports communicating with said chamber, and wherein said stationary primary seal members have extensions with apertures extending radially therethrough for permitting barrier fluid access between said sleeve and surfaces of said seal members thereadjacent in said chamber.

5. The seal assembly of claim 4 wherein said biasing means comprises compression springs located outside of the equipment and said gland, said springs isolated by said outboard seal and associated secondary seals from said process or barrier fluids.

6. The seal assembly of claim 1 wherein said primary seal members each define generally radially extending piston areas on the non-face-seal sides thereof, each said piston area radially aligned with and smaller than said contact area associated therewith, and each piston area being a predetermined fixed area equal to a major section of said associated contact area.

7. The seal assembly of claim 6, wherein each said primary seal member defines a generally radially extending piston area on a non-seal-face side thereof, said piston areas radially aligned with and smaller than its associated said contact area, and each piston area being a predetermined fixed area equal to a major section of its associated said contact area, wherein a plurality of secondary seals seal fixed diameters of said primary seal members at positions spaced axially from said seal faces thereof to prevent passage of fluid axially along said seal members.

8. The seal assembly of claim 1 wherein an outermost one of said primary seal members of said second primary seal member pair is positioned at said outboard end of said seal assembly with the non-face-seal side of said outermost member facing axially outwardly away from the others of said primary seal members, said outermost member outwardly facing side comprising a generally radially extending outer piston area radially aligned with and smaller than said contact area associated with said second pair and having a predetermined fixed area equal to a major portion of said associated contact area, said outer piston area extending radially inwardly toward said support sleeve in fluid communication with the inner periphery of said primary seal members.

9. The seal assembly of claim 8 wherein an innermost one of said primary seal members of said first primary seal member pair is positioned at the inboard end of said seal assembly distal to said outermost primary seal member, with the non-face-seal side of said innermost one facing axially inwardly away from the others of said primary seal members, said piston area thereof extending radially inwardly and communicating with the inner periphery of said primary seal members, said piston areas of said innermost and outermost primary seal members being equal.

10. The seal assembly of claim 8 wherein said non-seal-face side of said innermost primary seal member abuts said flange, and wherein an innermost one of said primary seal members of said first primary seal member pair is positioned at the inboard end of said seal assembly distal to said outermost primary seal member, with the non-face-seal side of said innermost one facing axially inwardly away from the others of said primary seal members, said piston area thereof extending radially inwardly and communicating with the inner periphery of said primary seal members, and wherein said biasing means comprises compression springs at the outer end of said sleeve, said springs biasing all said primary seal members toward said flange.

11. The seal assembly of claim 1 wherein said innermost and outermost primary seal members each comprise an annular extension on the non-face-seal side thereof, said extensions having enlarged inner diameters relative to the inner diameters of the contact areas of said mated seal faces associated with said innermost and outermost primary seal members, the inner diameters of said extensions being equal to the outer diameters of said piston areas of said innermost and outermost primary seal members, wherein a respective secondary seal seals positions axially spaced from said associated piston areas.

12. The seal assembly of claim 11 wherein said innermost and outermost primary seal members are mounted on said sleeve and the others of said primary seal members of said first and second primary seal member pairs each comprise an associated annular extension on said non-face-seal side thereof, said associated extensions having reduced outer diameters relative to the outer diameters of the contact areas of said seal faces associated with said others of said primary seal members, the outer diameters of said associated extensions being equal to the inner diameter of the associated said piston area of said others of said primary seal members, further comprising a respective secondary seal for sealing against an associated one of said annular extensions of said others of said primary seal members at positions spaced from the piston areas associated with said other of said primary seal members.

13. The seal assembly of claim 1 further comprising a secondary seal for sealing each said stationary primary seal member to said stationary housing part and a secondary seal for sealing each said rotary primary seal member to said support sleeve, wherein said primary seal members each define a generally radially extending piston area on the non-face-seal side thereof, each said piston area being radially aligned with and smaller than said contact area with which it is associated, and each piston area being a predetermined fixed area equal to a major portion of said associated contact area, one of said secondary seals having a radial cross-section extending to a first inner diameter, and said contact area associated with said one of said secondary seals having a radial cross-section extending to an inner diameter which is independent of said first inner diameter.

14. The seal assembly of claim 13 wherein one primary seal member of said first pair of said primary seal members and one primary seal member of said second pair of said primary seal members each comprises an annular extension thereof on the side opposite its said seal face side, each said extension having a reduced outer diameter relative to the outer diameter of said contact area of the associated seal, each said reduced outer diameter of said extension defining the inner diameter of said piston area of the associated seal, one said secondary seal sealing against one said annular extension and another said secondary seal sealing against another said extension at positions spaced from each other and spaced from the associated said piston area.

15. The seal assembly of claim 14, wherein said seal assembly seals process fluid in said equipment in a first fluid environment at said seal associated with said innermost primary seal member and seals a second fluid environment between said inner seal and said seal associated with said outermost primary seal member, wherein two of said primary seal member piston areas are exposed to said second fluid environment and another one of said primary seal member piston areas is exposed to said first fluid environment.

16. The seal assembly of claim 15 further comprising a sleeve for mounting concentrically over said shaft and an annular gland for mounting to said equipment concentrically to said shaft, wherein two of said primary seal members are non-rotatably mounted to said gland with secondary seals associated with and sealing said two members to said gland and wherein two other of said primary seal members are rotatably mounted to said sleeve with secondary seals associated with and sealing said two other members to said sleeve, said gland having an inner diameter which defines a recess for capture of a respective one of said gland-associated secondary seals for preventing axial displacement of said gland-associated secondary seals within said seal assembly, and said sleeve defining a capture recess for capture of one of said sleeve-associated secondary seals for preventing axial displacement of said sleeve-associated secondary seals within said seal assembly.

17. A mechanical seal assembly for sealing the shaft of rotary equipment, the assembly having first and second pairs of primary seal members, each said pair of seal members including a stator seal member and a rotor seal member, each said seal member having a seal face side and a non-seal face side, and each said pair respectively defining a seal contact area where said respective stator and rotor seal member seal faces meet for forming a fluid seal thereat, a first of said pairs establishing an inboard seal adjacent to the equipment for sealing a first fluid environment and a second of said pairs establishing an outboard seal distal to said inboard seal for sealing a second fluid environment, the assembly comprising:

a sleeve with a bore for mounting of said sleeve on the equipment shaft, said sleeve having an axially extending outer surface for mounting of said rotor seal members thereon, said sleeve further comprising an inboard flange end and an outboard biasing end, said flange end having a flange surface radially extending essentially perpendicular to said sleeve outer surface, wherein said seal members are mounted concentrically to said shaft with one said rotor seal member being located furthest inboardly along said shaft adjacent to said equipment and the other said rotor seal member being located furthest outboardly along said shaft, said furthest inboard rotor seal member being mounted with its non-seal-face side abutting said flange surface, said furthest outboard rotor seal members having its non-seal-face side facing outboardly; and biasing means mounted on said sleeve at said sleeve outboard end and contacting said non-seal-face side of said outboard rotor seal member for biasing all said seal members toward said flange.

* * * * *